US008510955B2

United States Patent
Feichter et al.

(10) Patent No.: US 8,510,955 B2
(45) Date of Patent: Aug. 20, 2013

(54) INNER JOINT PART FOR A CONSTANT VELOCITY UNIVERSAL JOINT AND PROCESS OF PRODUCING SAME

(75) Inventors: Bruno Feichter, Bruneck/Reischach (IT); Carlo Faustini, Bruneck (IT)

(73) Assignee: GKN Driveline Bruneck AG, Bruneck (IT)

( * ) Notice: Subject to any disclaimer, the term of this patent is extended or adjusted under 35 U.S.C. 154(b) by 781 days.

(21) Appl. No.: 12/619,197

(22) Filed: Nov. 16, 2009

(65) Prior Publication Data

US 2010/0064498 A1  Mar. 18, 2010

Related U.S. Application Data

(62) Division of application No. 11/536,586, filed on Sep. 28, 2006, now Pat. No. 7,637,819.

(30) Foreign Application Priority Data

Sep. 28, 2005 (IT) .............................. MI2005A1793
Dec. 30, 2005 (DE) ......................... 10 2005 063 006

(51) Int. Cl.
*B21D 53/10* (2006.01)

(52) U.S. Cl.
USPC ................ 29/898.066; 29/898.06; 29/898.13

(58) Field of Classification Search
USPC ............... 29/898.054, 898.06, 898.066, 557, 29/558, 898.13
See application file for complete search history.

(56) References Cited

U.S. PATENT DOCUMENTS

| | | | |
|---|---|---|---|
| 2,949,022 A | 8/1960 | Leon | |
| 3,488,979 A | 1/1970 | Croset | |
| 4,319,465 A | 3/1982 | Ito et al. | |
| 5,954,587 A | 9/1999 | Jacob et al. | |
| 6,234,908 B1 | 5/2001 | Jacob | |
| 6,332,844 B1 | 12/2001 | Hayama et al. | |
| 6,468,164 B2 | 10/2002 | Song | |
| 6,517,278 B2 | 2/2003 | Moulinet | |
| 6,665,936 B1 | 12/2003 | Kochsiek et al. | |
| 6,877,350 B2 | 4/2005 | Fuhrmann et al. | |
| 7,393,284 B2 | 7/2008 | Hassenrik et al. | |
| 2002/0065138 A1 | 5/2002 | Johnson et al. | |
| 2002/0193166 A1 | 12/2002 | Cermak | |
| 2004/0231130 A1 | 11/2004 | Cermak | |
| 2005/0070364 A1 | 3/2005 | Matsumoto et al. | |

(Continued)

FOREIGN PATENT DOCUMENTS

DE  10209933 A1  10/2003

OTHER PUBLICATIONS

English Abrstract for DE10032854 to Cermak, Apr. 2002.
English Abstract for DE102004009477 to Cermak, Sep. 2005.

(Continued)

*Primary Examiner* — David Bryant
*Assistant Examiner* — Ryan J Walters
(74) *Attorney, Agent, or Firm* — Rader, Fishman & Grauer, PLLC

(57) ABSTRACT

A process of producing an inner joint part for a constant velocity plunging joint is disclosed. The process includes providing a preformed blank, hardening the preformed blank, hard-machining first track portions, while second track portions remain unmachined. The preformed blank includes a longitudinal axis, an outer face with circumferentially distributed tracks, a central through-aperture, a first end face and a second end face opposed thereto. The tracks each comprise a first track portion having, in a cross-sectional view, a smaller track radius and a second track portion having, in a cross-sectional view, a greater cross-section.

15 Claims, 6 Drawing Sheets

(56) References Cited

U.S. PATENT DOCUMENTS

2005/0192106 A1    9/2005    Cermak
2006/0205522 A1    9/2006    Ichikawa et al.
2008/0214317 A1    9/2008    Weckerling et al.

OTHER PUBLICATIONS

English Abstract to DE10157401 to Johnson et al, Jun. 2002.
English Abstract to DE10304156 to Hassenrik et al, Aug. 2004.
English Abstract to DE19831010 to Jacob, Feb. 2000.
English Abstract to JP2000240673 to Hayama et al, Sep. 2000.

INNER JOINT PART FOR A CONSTANT VELOCITY UNIVERSAL JOINT AND PROCESS OF PRODUCING SAME

CROSS REFERENCE TO RELATED APPLICATIONS

The present application is a divisional of U.S. patent application Ser. No. 11/536,586, filed Sep. 28, 2006, the entirety of which is hereby incorporated by reference, and which application claims priority to Italian Application No. MI2005A-001793 filed Sep. 29, 2005 and German Application No. 102005063006.5 filed Dec. 30, 2005, the entireties of which are hereby incorporated by reference.

TECHNICAL FIELD

The invention relates to an inner joint part for a constant velocity universal joint, more particularly for a constant velocity plunging joint. The invention also relates to a process of formingly machining such an inner joint part during the production of same. Furthermore, the invention relates to a constant velocity universal joint having such an inner joint part.

BACKGROUND OF THE INVENTION

Inner joint parts for constant velocity plunging joints are known from the state of the art. Inside, they comprise a central through-aperture for receiving a shaft journal and, on their outside, they comprise ball tracks for receiving torque transmitting balls. From U.S. Pat. No. 6,877,350, there is known a process of and a device for producing an inner joint part for a constant velocity universal joint, the respective process stages consist of producing a blank with ball tracks which are largely finish-formed by a non-chip-forming forming operation, in finish-turning the outer surface and the through-aperture of the blank. The process also simultaneously calibrates the ball tracks by a non-chip-forming operation and forms the inner teeth in the through-aperture by means of a mandrel.

SUMMARY OF THE INVENTION

The present invention provides an inner joint part for a constant velocity universal joint as well as a process of producing such an inner joint part. The production process of the inner joint part is easy and cost-effective. An improved constant velocity universal joint with such an inner joint part is also provided.

A first solution provides an inner joint part for an constant velocity universal joint, more particularly for a constant velocity plunging joint, the inner joint part comprising: an outer spherical guiding face for guiding a ball cage of the constant velocity universal joint; a plurality of circumferentially distributed ball tracks formed into the spherical guiding face and provided for receiving torque transmitting balls; wherein the ball tracks each comprise a hard-machined first track portion for guiding the balls, as well as an unmachined second track portion which does not have a guiding function for the balls.

Soft-machining refers to a machining operation applied prior to hardening the inner joint part, whereas hard machining refers to a machining operation used after hardening. The machining operations are preferably of the chip-forming type, for instance turning operations. Because the first track portion is hard-machined and the second track portion remains unmachined, there is achieved, overall, a shortened machining time during the production of the inner joint part. A further advantage is that the first track portion represents only part of the ball track, so that the size of the cutting face is reduced, with tool wear during hard-machining being minimized. The inventive inner joint part is particularly suitable for those constant velocity universal joints wherein the ball track comprises only a partial operating range. More particularly, these are plunging joints, for example double offset plunging joints with parallel ball tacks or VL plunging joints with crossed ball tracks. However, in principle, the inventive inner joint part can also be used in fixed joints wherein part of the ball tracks does not have an operating function. In this case, the above-mentioned advantages of a shortened production time and an increased tool life would be achieved, with production being all the more advantageous the larger the size of the secondary face.

According to one embodiment, a step is formed between the first track portion and the second track portion, wherein the second track portion—as viewed in a longitudinal section through the track base—is formed down to a deeper depth. The second track portion formed in this way thus forms a run-out for a tool used for hard-machining the first track portion. The first track portion can comprise a longer length than the second track portion, with the length ratio of the first track portion relative to the entire length of the ball track ranging between approximately 0.5 and 0.95. In the case of double offset plunging joints, the ratio preferably ranges between approximately 0.6 and 0.85.

According to another aspect of the invention, a plane E which extends perpendicularly relative to the longitudinal axis A and which contains the greatest diameter of the spherical guiding face is positioned at unequal distances from the end faces. As a result of this configuration which is asymmetric with reference to the plane E, a considerable amount of material can be saved in the portion of the inner joint part with which the second track portions are associated. This results in a reduction in weight and provides cost savings.

According to a further embodiment, the inner joint part is a forging with formed-in ball tracks, wherein the second track portion of the ball tracks and an axially opposed front face starting from the preformed forging are preferably unmachined. It is thus possible to save production operations, which results in shorter production time and lower tool costs.

A further solution provides a process of producing an inner joint part for a constant velocity universal joint, more particularly for a constant velocity plunging joint, comprising the following process stages: providing a preformed blank having an outer face with circumferentially distributed tracks, a central through-aperture, a first end face and a second end face opposed thereto, wherein the tracks each comprise a first track portion having—in a cross-sectional view—a smaller track radius and a second track portion having—in a cross-sectional view—a greater cross-section; hardening of the preformed blank; hard-machining the first track portion, wherein the second track portion remains unmachined.

The inner joint part produced in accordance with the invention comprises the above-mentioned advantages of a rapid and cost-effective production, with the tool service life being increased due to the fact that only a partial portion of the ball track is hard-machined. That is, only the functional faces are machined, whereas the secondary faces remain unmachined. More particularly, the first end face in which the first track portions end remains unmachined, starting from the blank, and forms a first front face. The first front face can comprise an outer annular recess which is axially set back. The blank is a forging in the form of a precision blank.

According to another embodiment, the following process stages are provided before hardening takes place: soft machining of the second end face to produce a second front face in which the second track portions end; as well as soft machining the through-aperture for producing longitudinal teeth. After hardening, a further process stage of hard-machining the outer face for the purpose of producing a spherical guiding face can be carried out.

Hard-machining processes are preferably induction or case-hardening, with other standard hardening processes also being contemplated. The hard machining process stage can be a turning operation and/or a milling operation and/or a grinding operation.

A further solution provides a constant velocity universal joint, more particularly a constant velocity plunging joint, comprising an outer joint part having an inner spherical guiding face into which there are formed outer ball tracks; an inner joint part having outer spherical ball tracks into which there are formed inner ball tracks; torque transmitting balls which are each guided in a pair of tracks formed of an outer ball track and an inner ball track; a ball cage with windows for receiving the torque transmitting balls; wherein the inner ball tracks of the inner joint part comprise a hard-machined track portion for guiding the balls, as well as an unmachined second track portion which does not have a guiding function for the balls.

The constant velocity universal joint can be provided in the form of a constant velocity plunging joint and comprise an internally cylindrical guiding face at the outer joint part and a spherical guiding face at the inner joint part. The inner joint part is designed according to one of the above-mentioned embodiments, with the inventive inner joint part contributing to achieving an improved constant velocity universal joint because, overall, it can be produced more advantageously.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1A:
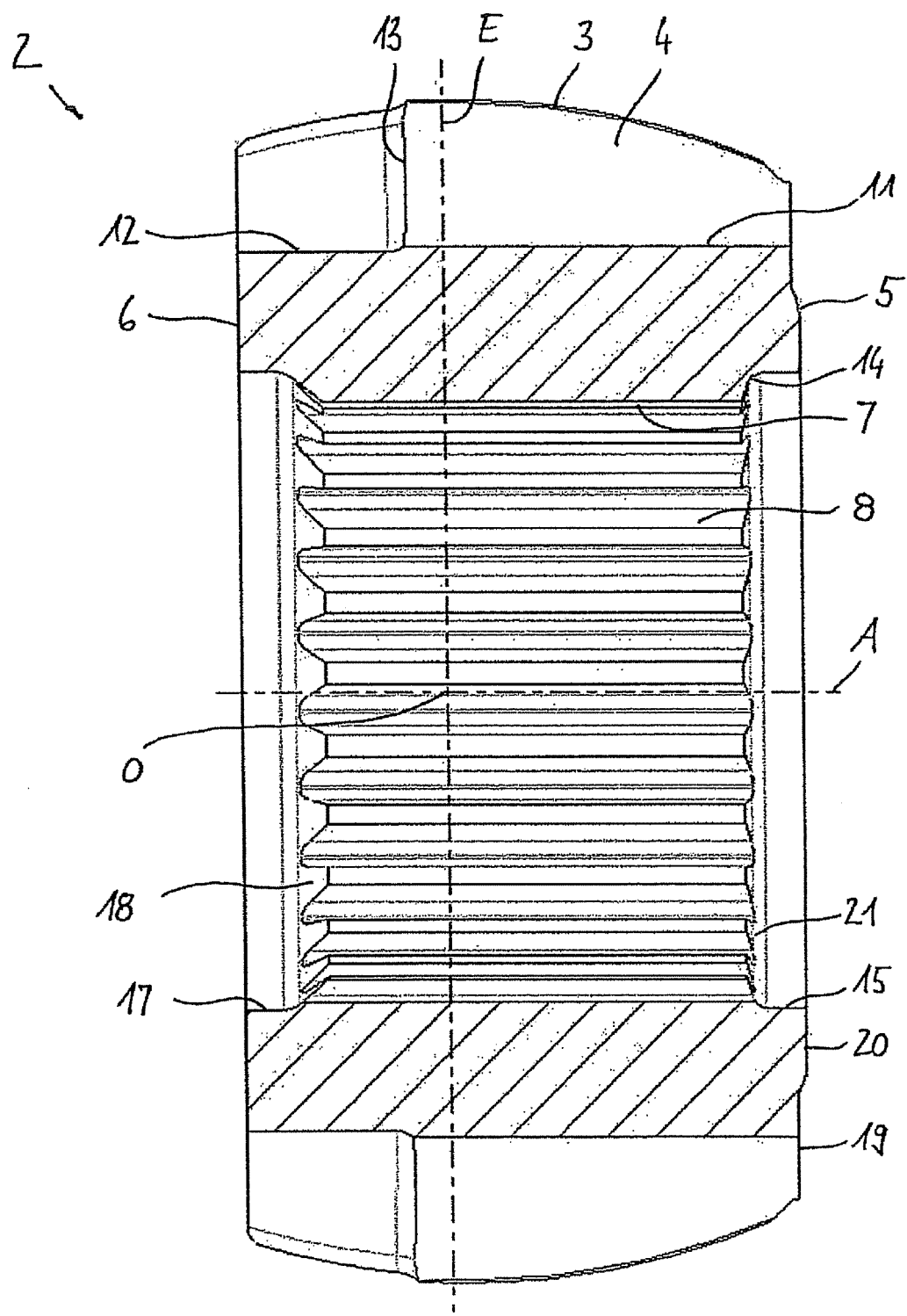
FIG. 1 shows an inventive inner joint part for a double offset plunging joint:
A) in a longitudinal section through two ball tracks; and
B) in a longitudinal section through two webs.
Figure 1B:
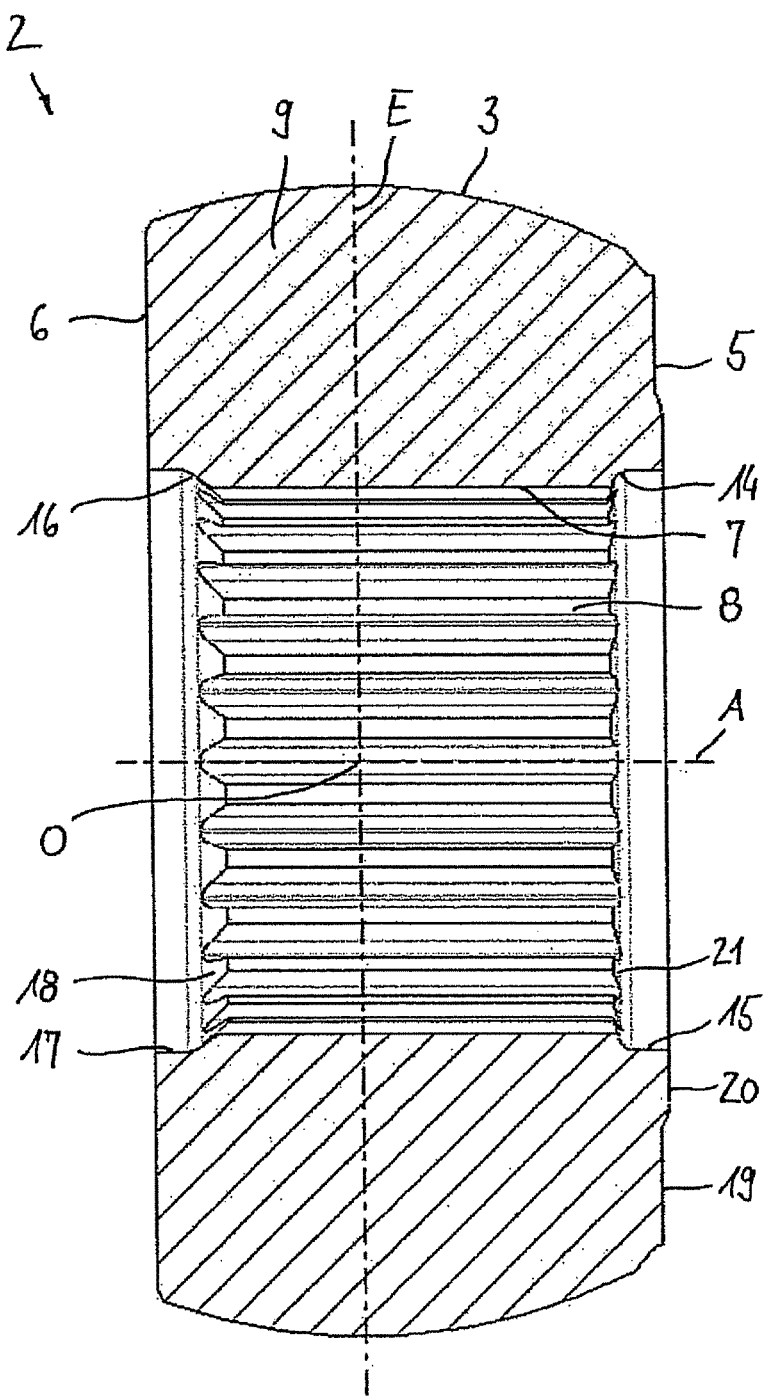

FIG. 1 shows an inner joint part 2 for a constant velocity universal joint which will be described below in greater detail and which is provided in the form of a constant velocity plunging joint. The constant velocity plunging joint, in addition to the inner joint part 2, comprises an outer joint part, a ball cage as well as torque transmitting balls which are held in windows of the ball cage.

The inner joint part 2 comprises an outer spherical guiding face 3 which is in contact with an inner spherical control face of the ball cage, a plurality of circumferentially distributed ball tracks 4 which accommodate torque transmitting balls, a first front face 5, a second front face 6 which is opposed to the first front face 5, as well as a central through-aperture 7 with inner teeth 8 into which there can be inserted a shaft (not shown) in a rotationally fixed way. It can be seen that the outer spherical guiding face 3 comprises a maximum diameter, with a plane E which, in the center of curvature O of the spherical guiding face 3, is positioned perpendicularly relative to the longitudinal axis A, dividing the inner joint part into two portions of unequal axial length. As a result of this embodiment which is asymmetric relative to the plane E, a considerable amount of material can be saved on the side of the inner joint part 2 which is delimited by the second front face 6. Further axial shortening of the inner joint part 2 is limited by the required minimum length of the spherical guiding face 3 which, in a developed view of the joint, along its entire axial length, comprises a guiding function relative to the ball cage (not shown here).

The ball tracks 4 which extend parallel relative to the longitudinal axis A interrupt the spherical outer guiding face 3, so that a web 9 is formed between each two adjoining ball tracks 4. The number of ball tracks 4 depends on the number of torque transmitting balls to be used. Normally, constant velocity universal joints require six or eight balls for the driveline of a motor vehicle, with other numbers of balls being conceivable as well. It can be seen that the ball tracks 4 each comprise a first track portion 11 with a smaller track radius, if viewed in a cross-sectional end view, and an axially adjoining second track portion 12 with a greater track radius. Only the longer first track portion 11 serves to guide the balls when the joint is articulated, whereas the second track portion 12 does not have a guiding function for the balls. Between the first track portion 11 and the second track portion 12 there is thus formed a step 13, with the second track portion 12 being deeper, if viewed in a longitudinal section through the track base. The length ratio of the first track portion 11 relative to the entire track length can range between approximately 0.5 and 0.95. In the case of double offset plunging joints, the ratio can range between approximately 0.6 and 0.85. This embodiment makes it possible for only the ball guiding first track portion 11 to be machined whereas the second track portion 12 is only used as a run-out for a machining tool and remains unmachined, starting from a forged blank.

In side regions axially adjoining the longitudinal teeth 8, the inner joint part comprises an extended face 14 with an internally cylindrical portion 15 and an adjoining abutment face 21, as well as a second extended face 16 with an internally cylindrical portion 17 and a conical portion 18 adjoining the latter. The conical portion 18 serves as an introducing cone for the shaft to be inserted (not shown), which shaft is axially fixed by an axial securing ring, for example, relative to the inner joint part 2. For this purpose, the axial securing ring (not shown) engages an annular groove in the shaft and is supported against the abutment face 21. The first front face 5 comprises a recess 19 positioned on the radial outside, so that an annular projection 20 is formed on the inside.

A description of the individual process stages for producing the inventive inner joint part 2 with reference to FIG. 2 follows. Any components identical to those shown in FIG. 1 are given the same reference numbers and the reference numbers of provisional components are increased by 100.

Figure 2A:
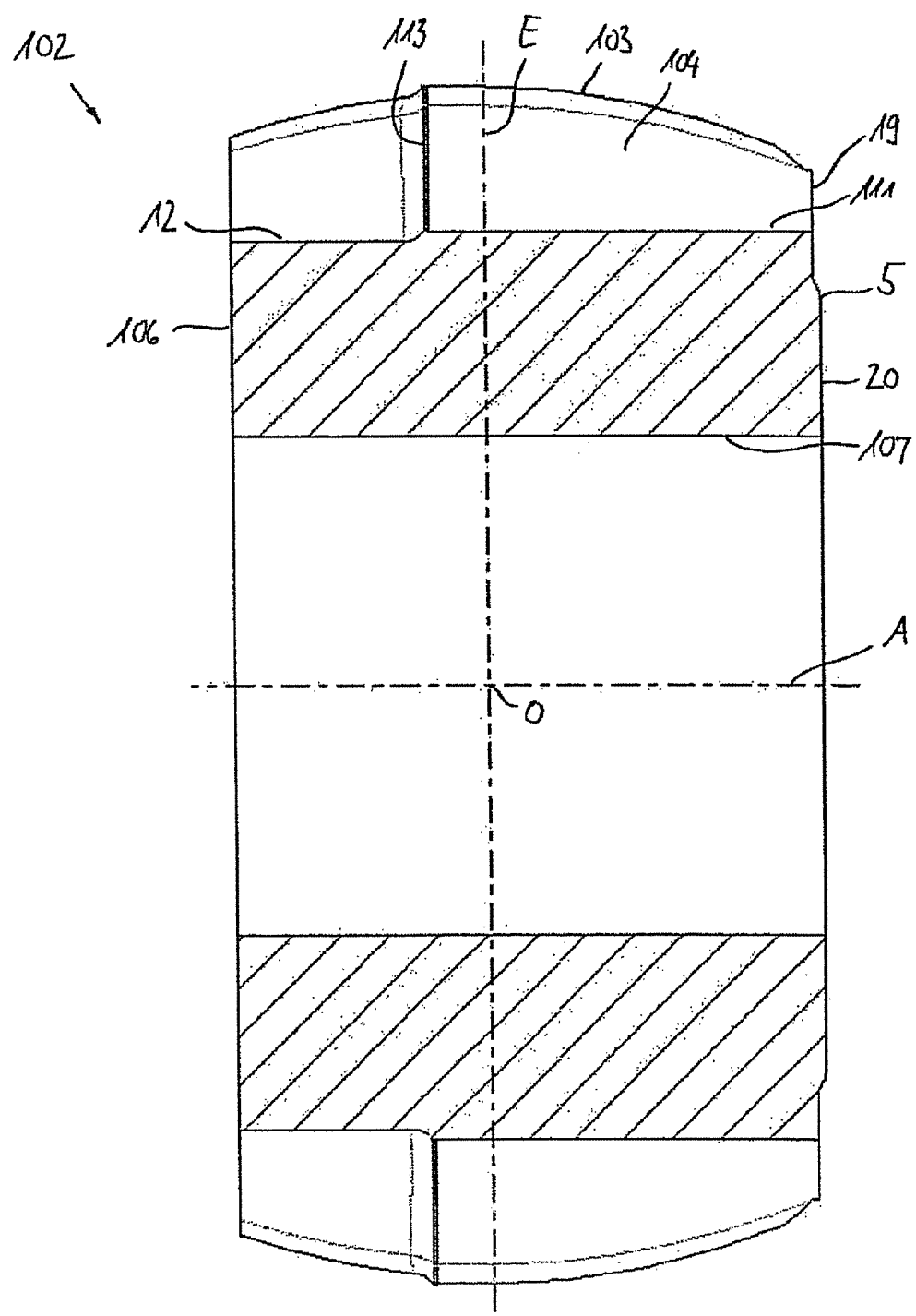
FIG. 2 shows the inventive inner joint part while being produced, involving the following process stages:
A) in the form of a blank;
B) after a turning operation; and
C) after a broaching operation.

The starting point is a blank 102 which already partially comprises the contours of the finish-machined inner joint part 2 and which is illustrated in FIG. 2A. The blank 102 is provided in the form of a precision blank and is preformed by solid forming, for example by forging. The blank 102 is annular in shape and comprises a first axial end face 5 and a second axial end face 106 extending in the opposite direction, an outer face 103 and an inner through-aperture 107. In the blank 102 there are provided longitudinally extending tracks 104 which interrupt the spherical outer face 103 and which, already after forging, comprise a first track portion 111 and a second track portion 12. The first end face 5 already has an annular projection 20.

Figure 2B:
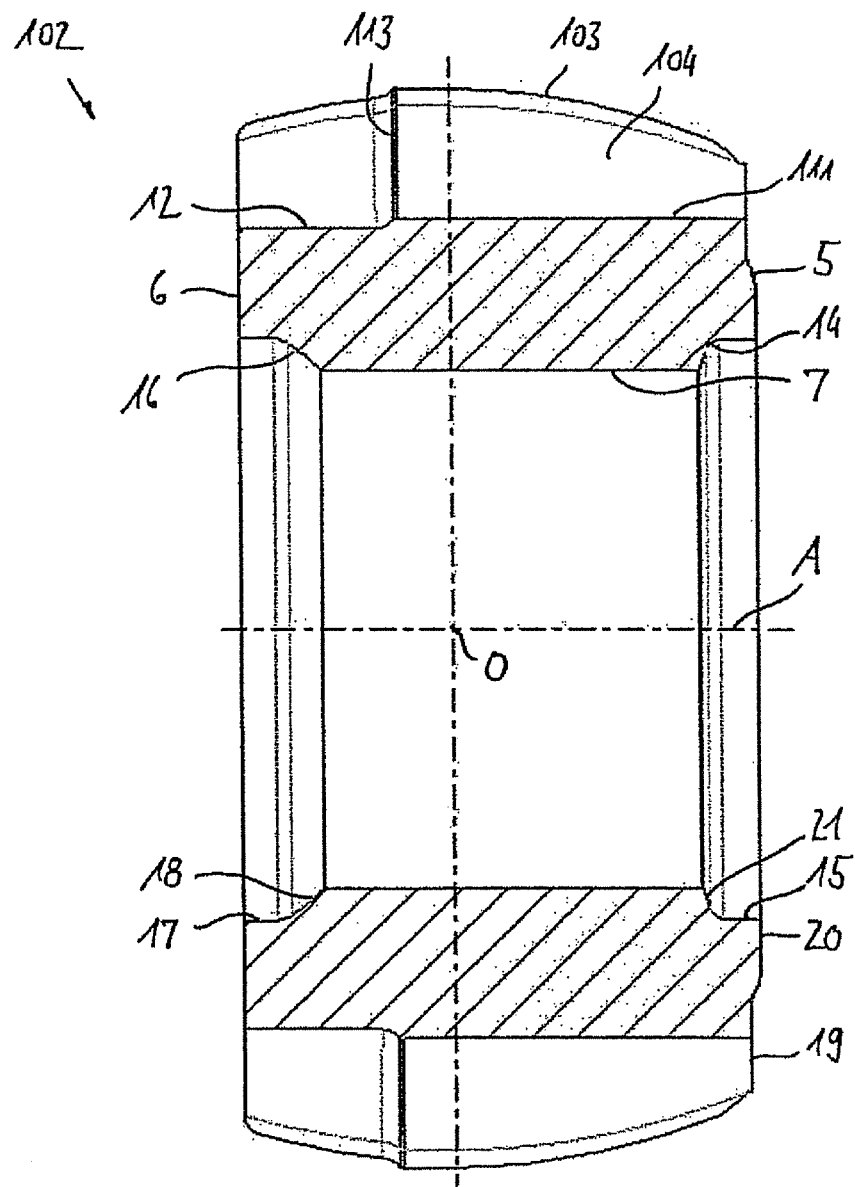

At its end associated with the first end face 5, the blank 102 is clamped in and undergoes a turning operation during a subsequent production stage. The intermediate product obtained after the turning operation is illustrated in FIG. 2B. During the turning operation, the second end face 106 is machined by turning in order to obtain the second front face 6. Furthermore, the through-aperture 107 is produced by a turning operation, with the first extended face 14, the second extended face 16 and the intermediate internally cylindrical portion 7 being produced in the process. The inner diameter of the cylindrical portion 7 which forms the through-aperture approximately corresponds to the major diameter of the longitudinal teeth to be worked in. The remaining faces, i.e. the spherical outer face 103, the ball tracks 104 and the first end face 5 remain unmachined or at least initially unmachined.

Figure 2C:
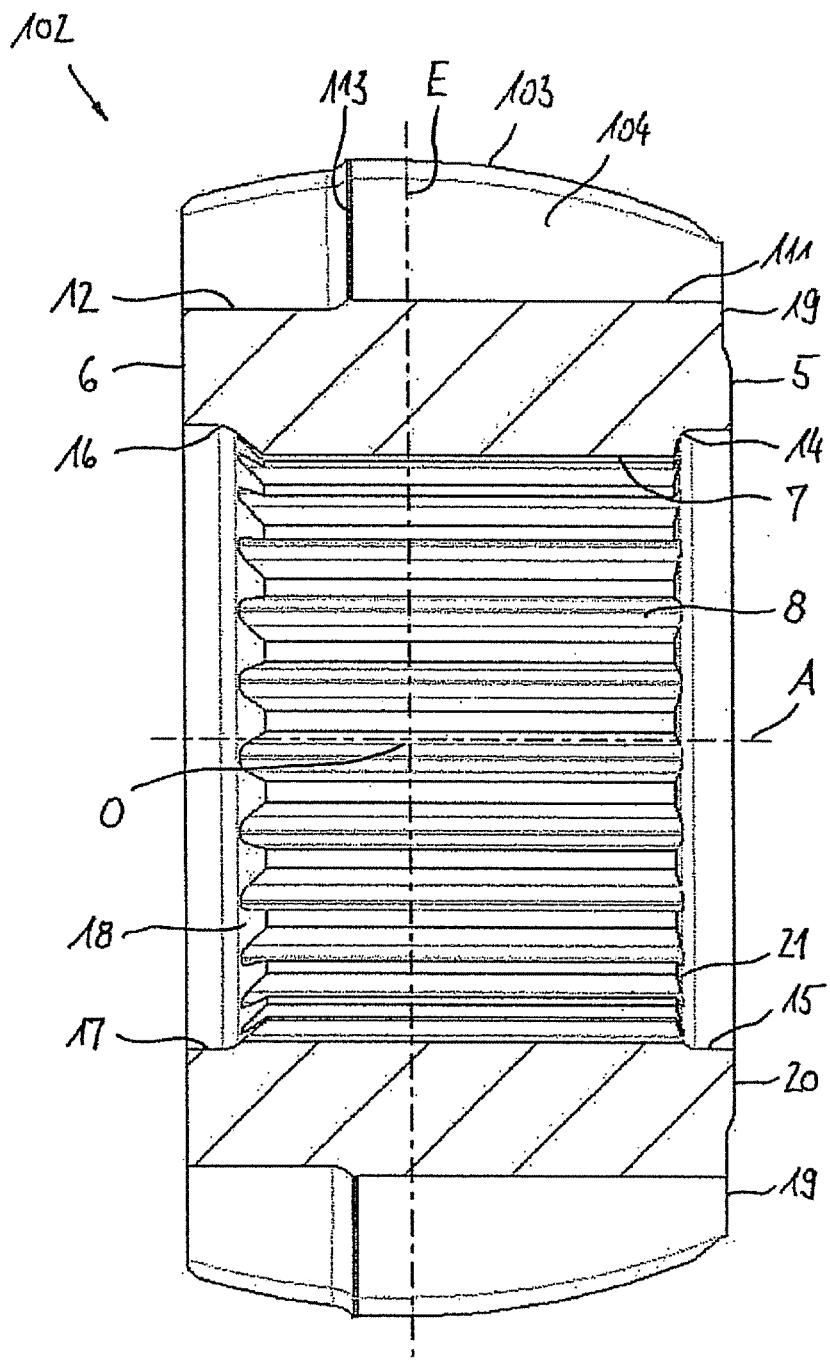

After completion of the turning operation, the longitudinal teeth 8 are produced by broaching in the inner joint part. FIG. 2C shows the inner joint part 2 after the broaching operation, with the longitudinal teeth 8 being visible. After broaching, the inner joint part 2 is hardened. The hardening method can be either induction hardening or case-hardening. Other hardening processes are also contemplated. After hardening, the outer face 103 which had remained unmachined so far is hard-machined, with turning or grinding being suitable production processes. During hard-machining, the excess dimension of the spherical outer face 103 of the blank is removed by a chip-forming method in order to produce the outer spherical guiding face 3. The excess dimension amounts to just a few tenths of a millimeter, in most cases. After the spherical guiding face 3 has been produced, the first portions 111 of the tracks 104 are hard-machined for the purpose of forming the first track portions 11 of the ball tracks 4, with suitable machining methods being grinding or milling.

The first end face 5 and the second track portions 12 of the ball tracks 4 remain unmachined up to this point, so that production stages are saved. The finish-machined inner joint part 2 is shown in FIG. 1, the description of which is detailed above. In this embodiment, the outer spherical guiding face 3 has been produced from the outer face 103, with the first ball track portions 11 having been produced from the portions 111.

Figure 3:
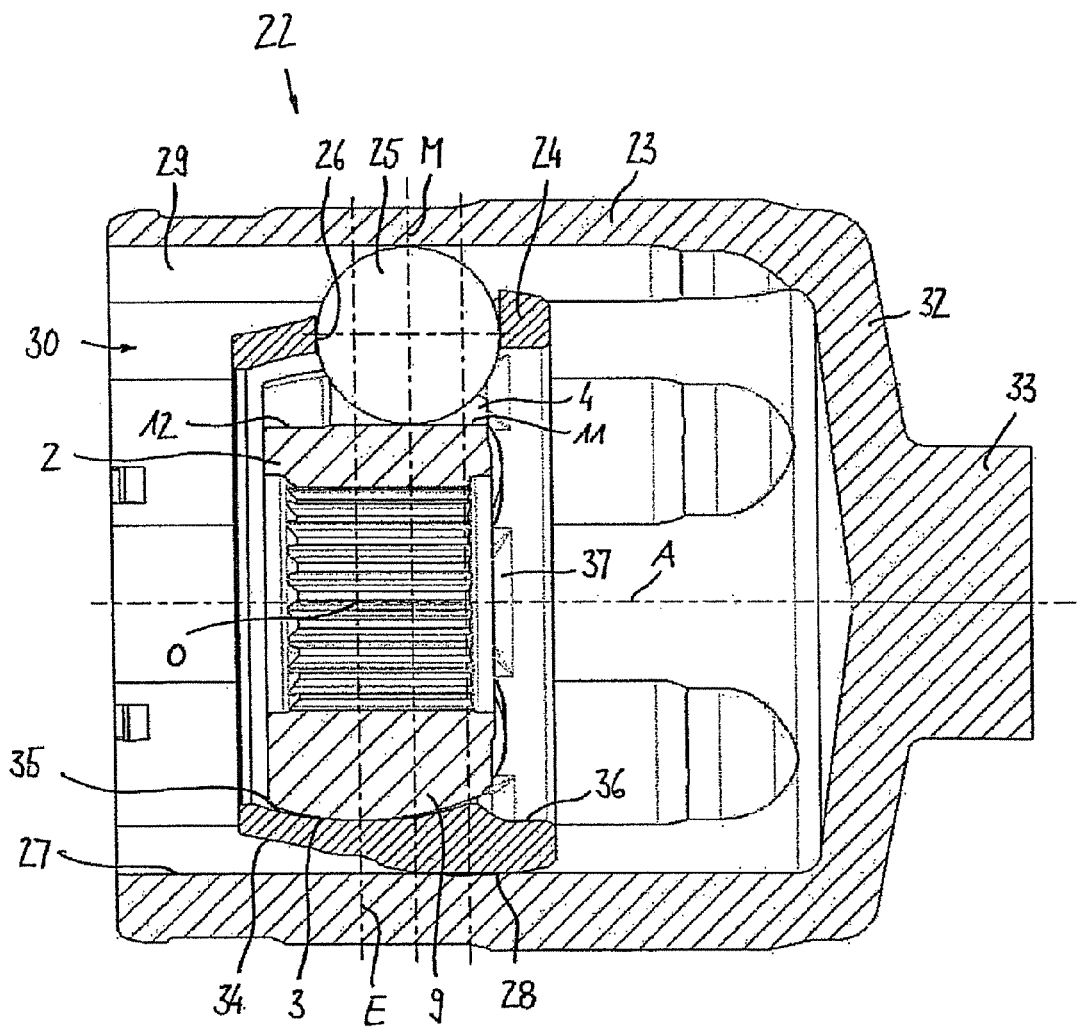
FIG. 3 shows an inventive double offset constant velocity plunging joint with an inventive inner joint part.

FIG. 3 shows an inventive constant velocity plunging joint 22 with an inventive inner joint part 2 in the above embodiment, an outer joint part 23, a ball cage 24 and torque transmitting balls 25 which are each held in an associated window 26 of the ball cage 24 in a common center plane M. The outer joint part 23 has an internally cylindrical guiding face 27 which is contacted by a spherical control face 28 of the ball cage 24 and guided therein. Furthermore, the outer joint part 23 comprises a plurality of circumferentially distributed, longitudinally extending outer ball tracks 29 which extend over a substantial part of the outer joint part 23 as far as the open end 30. In each pair of tracks formed of an inner ball track 4 of the inner joint part 2 and of an outer ball track 29 of the outer joint part 23 there is guided a torque transmitting ball 25, with the windows 26 of the ball cage 24 jointly defining the center plane M in which the balls are held. This plane represents the angle-bisecting plane between the inner joint part 2 and the outer joint part 23 when the joint is articulated. At the end opposite the open end, the outer joint part 23 is closed in a bell-like way and comprises a base 32 with a formed-on journal 33 which serves torque transmitting purposes. In this example, the base 32 and journal 33 are integral, although they need not be in all applications.

The ball cage 24 extends annularly around an axis of rotation and, in the region adjoining the outer spherical control face 28, comprises a substantially conical free face 34 which substantially tangentially adjoins the control face 28, with the cone angle approximately corresponding to half the maximum articulation angle of the constant velocity plunging joint 22. On its inside, the ball cage 24 forms a concave inner spherical control face 35 for guiding the ball cage 24 relative to the outer spherical guiding face 3 of the inner joint part 2. The outer control face 28 comprises a greatest outer diameter which is positioned at approximately the same axial distance from the center plane M in the direction opposed to the direction of the greatest inner diameter of the inner control face 35. The offset of the maximum diameters of the control faces gives the joint its name, i.e. double offset joint.

The inner spherical control face 35 of the ball cage 24 is followed, axially approximately in the region of the greatest diameter of the outer spherical control face 28, by an undercut-free extended face 36 which widens the cage ring towards the cage aperture, with the extended face 36 forming a greater inner aperture which is directed to the base 32 of the outer joint part 23 and whose diameter—for assembly purposes— is greater than the outer diameter of the inner joint part 2. On the opposite side, the ball cage 24 comprises a smaller inner aperture whose diameter is smaller than the outer diameter of the inner joint part 2 and thus forms an axial abutment. The extended face 36 is designed in such a way that the inner joint part 2 can be axially introduced into the ball cage 24 from the greater inner aperture. For this purpose, the inner face of the ball cage 24 is provided with keyways 37 which, during the introducing process, provide sufficient space for the webs 9 of the inner joint part 2. In the fully introduced condition, the inner joint part 2 is rotated relative to the ball cage 24 in such a way that the inner ball tracks 4 are positioned in the region of the windows 26, so that the balls 25 can be inserted.

The inner joint part 2 corresponds to the inner joint part according to FIGS. 1 and 2 to the description of which reference is hereby made. The ball tracks 4 with the hard-machined first track portion 11 and the adjoining unmachined second track portion 12 can be clearly seen. By using the inventive inner joint part 2, the overall production costs of the constant velocity universal joint 22 are reduced.

While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. A process of producing an inner joint part for a constant velocity plunging joint, the process comprising:
providing a preformed blank with a longitudinal axis, said preformed blank having an outer face with circumferentially distributed ball tracks, a central through-aperture, a first end face and a second end face opposed thereto, wherein the ball tracks each comprise a first track portion having a first track radius; in a cross-sectional view and a second track portion having a second track radius in a cross-sectional view, said first track radius being smaller than said second track radius;

soft-machining the second end face to produce a soft-machined second front face into which the second track portions open, wherein the first end face into which the first track portions open remains unmachined and forms an unmachined first front face;

hardening the preformed blank;

hard-machining the outer face to produce a spherical guiding face;

hard-machining the first track portion of said ball tracks, wherein the second track portions of said ball tracks remain unmachined;

wherein, after machining, a first distance between the unmachined first front face and a plane, which extends perpendicular relative to said longitudinal axis and which contains a greatest diameter of a spherical guiding face, is longer than a second distance between the soft-machined second front face and said plane.

2. A process according to claim 1, wherein the preformed blank is a forging in the form of a precision blank.

3. A process according to claim 1, comprising, prior to hardening, soft-machining the second end face for producing a second front face into which the second track portions open.

4. A process according to claim 1, wherein the first front face comprises an outer annular recess which is axially set back.

5. A process according to claim 1, wherein the first end face into which the first track portions open, remains unmachined, and forms a first front face.

6. A process according to claim 1, comprising, prior to hardening, soft-machining the through-aperture to produce longitudinal teeth.

7. A process according to claim 1, comprising, after hardening, hard-machining the outer face to produce a spherical guiding face.

8. A process according to claim 1, wherein the preformed blank is formed such that a step is formed between the first track portion and the second track portion, wherein the second track portion, viewed in a longitudinal section through a track base, is formed down to a deeper depth.

9. A process according to claim 1, wherein the preformed blank is formed such that the first track portion comprises a greater length than the second track portion.

10. A process according to claim 1, wherein the preformed blank is formed such that at least the first track portions extend straight, if viewed in a section through a base of said tracks.

11. A process according to claim 1, wherein the preformed blank is formed such that at least the first track portions extend parallel to the longitudinal axis.

12. A process according to claim 1, wherein the step of hard-machining the first track portions comprises at least one of a turning operation, a milling operation, and a grinding operation.

13. A process according to claim 1, wherein the blank is preformed by solid forming.

14. A process according to claim 1, wherein the preformed blank is formed such that the outer face is convex, wherein a first blank distance between the first end face and a blank plane is longer than a second blank distance between the second end face and said blank plane, said blank plane extending perpendicularly relative to the longitudinal axis and containing a greatest diameter of the outer face.

15. A process of producing an inner joint part for a constant velocity plunging joint, the process comprising:

providing a preformed blank with a longitudinal axis, said preformed blank having an outer face with circumferentially distributed ball tracks and a central through-aperture, wherein a first radius of a first track portion, in a cross-sectional view, being smaller than a second radius of a second track portion;

wherein a step is positioned between the first track portion and the second track portion such that the first track portion is a smooth and uninterrupted surface from the step to the first front face and the second track portion is a smooth and uninterrupted surface from the second front face to the step;

hardening the preformed blank;

hard-machining the outer face to produce a spherical guiding face, wherein a plane is defined which extends perpendicularly relative to the longitudinal axis and contains a greatest diameter of said spherical guiding face;

hard-machining the first track portion of said ball tracks, wherein the second track portions of said ball tracks remain unmachined;

wherein, after machining, a first distance between said plane and a first front face, into which the first track portions open, is longer than a second distance between said plane and a second front face, into which the second track portions open.

* * * * *

UNITED STATES PATENT AND TRADEMARK OFFICE
CERTIFICATE OF CORRECTION

PATENT NO. : 8,510,955 B2
APPLICATION NO. : 12/619197
DATED : August 20, 2013
INVENTOR(S) : Bruno Feichter et al.

It is certified that error appears in the above-identified patent and that said Letters Patent is hereby corrected as shown below:

In the Claims

At column 6, claim number 1, line number 64, please delete the ";" after the word radius[;].

At column 7, claim number 1, line number 14, in the phrase, "greatest diameter of a spherical guiding face", the word "a" should be deleted and replaced with the word "the".

Signed and Sealed this
Twenty-sixth Day of November, 2013

Margaret A. Focarino
*Commissioner for Patents of the United States Patent and Trademark Office*